(12) United States Patent
Munkberg et al.

(10) Patent No.: US 9,401,046 B2
(45) Date of Patent: Jul. 26, 2016

(54) MICROPOLYGON SPLATTING

(75) Inventors: Carl J. Munkberg, Malmö (SE); Tomas G. Akenine-Möller, Lund (SE); Jon N. Hasselgren, Bunkeflostrand (SE); Robert M. Toth, Lund (SE)

(73) Assignee: Intel Corporation, Santa Clara, CA (US)

(*) Notice: Subject to any disclaimer, the term of this patent is extended or adjusted under 35 U.S.C. 154(b) by 532 days.

(21) Appl. No.: 13/021,893

(22) Filed: Feb. 7, 2011

(65) Prior Publication Data

US 2012/0200569 A1 Aug. 9, 2012

(51) Int. Cl.
*G06T 17/20* (2006.01)
*G06T 15/04* (2011.01)

(52) U.S. Cl.
CPC .............. *G06T 17/205* (2013.01); *G06T 15/04* (2013.01)

(58) Field of Classification Search
USPC .......................................................... 345/423
See application file for complete search history.

(56) References Cited

U.S. PATENT DOCUMENTS

| | | | | |
|---|---|---|---|---|
| 4,912,664 A | * | 3/1990 | Weiss et al. ................... 716/55 |
| 5,257,346 A | * | 10/1993 | Hanson ....................... 345/582 |
| 5,440,682 A | * | 8/1995 | Deering ....................... 345/503 |
| 5,684,939 A | * | 11/1997 | Foran .................... G06T 11/001 345/612 |
| 5,903,273 A | * | 5/1999 | Mochizuki et al. ........... 345/423 |
| 5,933,153 A | * | 8/1999 | Deering et al. .............. 345/501 |
| 6,184,908 B1 | * | 2/2001 | Chan et al. ................... 345/522 |
| 6,307,555 B1 | * | 10/2001 | Lee .............................. 345/423 |
| 6,356,263 B2 | * | 3/2002 | Migdal et al. ................. 345/423 |
| 6,429,865 B1 | * | 8/2002 | Marshall ................. G06T 17/20 345/420 |
| 6,466,207 B1 | * | 10/2002 | Gortler ................. G06T 15/205 345/419 |
| 6,525,722 B1 | * | 2/2003 | Deering ........................ 345/419 |
| 6,639,597 B1 | * | 10/2003 | Zwicker ............... G06T 15/405 345/421 |
| 6,798,411 B1 | * | 9/2004 | Gorman ................ G06T 17/20 345/420 |
| 7,023,435 B1 | * | 4/2006 | Litke et al. .................... 345/420 |
| 7,200,532 B1 | * | 4/2007 | Cheng ............................. 703/2 |
| 7,903,112 B2 | * | 3/2011 | Yamada ....................... 345/423 |
| 2002/0180748 A1 | * | 12/2002 | Popescu ............... G06T 15/205 345/582 |
| 2004/0001069 A1 | * | 1/2004 | Snyder et al. ................. 345/582 |
| 2004/0012603 A1 | * | 1/2004 | Pfister et al. .................. 345/582 |
| 2004/0196285 A1 | * | 10/2004 | Rice ........................ G06T 17/20 345/423 |
| 2007/0188487 A1 | * | 8/2007 | Brokenshire et al. ......... 345/419 |
| 2007/0247458 A1 | * | 10/2007 | Surazhsky .................... 345/423 |
| 2008/0043016 A1 | * | 2/2008 | Huang et al. ................. 345/423 |
| 2009/0167776 A1 | * | 7/2009 | Barenbrug .............. G06T 15/04 345/582 |
| 2011/0310102 A1 | * | 12/2011 | Chang ........................... 345/423 |
| 2012/0092340 A1 | * | 4/2012 | Sarnoff ................. G06T 11/203 345/420 |

OTHER PUBLICATIONS

Tim Weyrich et al., "A Hardware Architecture for Surface Splatting", ACM SIGGRAPH 2007 conference proceedings, pp. 1-11.
Jon Hasselgren et al., "Automatic Pre-Tessellation Culling", ACM Transactions on Graphics, vol. 28, No. 2, Article 19, Apr. 2009, 10 pages.
C. Elisenacher and C. Loop, "Data-parallel Micropolygon Rasterization", The Eurographics Association 2010, 4 pages.

(Continued)

*Primary Examiner* — Andrew G Yang
(74) *Attorney, Agent, or Firm* — Trop Pruner & Hu, P.C.

(57) ABSTRACT

Micropolygon splatting may involve tessellating by subdividing a mesh until triangle edges are shorter than 0.75 pixels. In some cases, rasterizing the primitive may be avoided.

24 Claims, 4 Drawing Sheets

(56) References Cited

OTHER PUBLICATIONS

Kayvon Fatahalian et al., "Data-Parallel Rasterization of Micropolygons with Defocus and Motion Blur", High Performance Graphics 2009, 10 pages.

Matthew Fisher et al., "DiagSplit: Parallel, Crack-Free, Adaptive Tessellation for Micropolygon Rendering", SIGGRAPH Asia 2009, 10 pages.

Michael Schwarz and Marc Stamminger, "Fast GPU-based Adaptive Tessellation with CUDA", Eurographics 2009, vol. 28, No. 2, 10 pages.

J. S. Brunhaver et al., "Hardware Implementation of Micropolygon Rasterization with Motion and Defocus Blur", High Performance Graphics 2010, 9 pages.

Anjul Patney et al., "Parallel View-Dependent Tessellation of Catmull-Clark Subdivision Surface", High Performance Graphics, Aug. 2009, pp. 99-108.

Anjul Patney and John D. Owens, "Real-Time Reyes-Style Adaptive Surface Subdivision", ACM Transactions on Graphics, (Proceedings of ACM SIGGRAPH Asia), vol. 27, Issue 5, Dec. 3, 2008, 8 pages.

Kayvon Fatahalian et al., "Reducing Shading on GPUs using Quad-Fragment Merging", SIGGRAPH 2010, 8 pages.

Tomas Akenine-Moller et al, "Stochastic Rasterization using Time-Continuous Triangles", Department of Computer Science, Lund University Sweden, Graphics Hardware 2007, 37 pages.

Hanspeter Pfister et al., "Surfels: Surface Elements as Rendering Primitives", SIGGRAPH 2000, 8 pages.

Tim Sweeney, "The End of the GPU Roadmap", Keynote at the High Performance Graphics conference, 2009.

Robert L. Cook et al., "The Reyes Image Rendering Architecture", Computer Graphics, (Proceedings of ACM SIGGRAPH Anaheim), vol. 21, No. 4, Jul. 27-31, 1987, pp. 95-102.

Marc Levoy and Turner Whitted, "The Use of Points as a Display Primitive", Technical Report TR 85-022, Department of Computer Science, University of North Carolina at Chapel Hill, 1985, 19 pages.

PCT International Search Report and Written Opinion issued in corresponding PCT/US2011/067952 dated Aug. 30, 2012 (9 pages).

\* cited by examiner

MICROPOLYGON SPLATTING

BACKGROUND

This relates basically to graphics processing and, particularly, to rendering micropolygons.

A geometric primitive may be split into smaller primitives several times until its screen space size is small enough, with frustum culling occurring at each stage. In addition, inside each tile of a screen, front to back sorting of the primitives may be done and each primitive may be occlusion culled against a hierarchical depth buffer. The splitting loop is executed until the input primitive has been divided into many small parts, and the screen space extents of each part is less than a user controlled threshold.

Dicing occurs next, where each sub-primitive is uniformly tessellated into a grid of sub-pixel sized quads or triangles called micropolygons. Each micropolygon is view frustum and back face culled. A micropolygon is a rendering primitive smaller than a pixel. It may, for example, be a quadrilateral or a triangle.

Displacement mapping may occur, where the displacement shader is executed per vertex in the grid.

DETAILED DESCRIPTION

In accordance with some embodiments, highly detailed geometries, such as depictions of hair, may be rendered by tessellating until triangles are sufficiently small so that pixel sized splats can be used. In some embodiments, bounding box computation, triangle set up, and rasterization can be avoided.

In computer graphics, higher order primitives are often tessellated into smaller display primitives, typically triangles. An alternative representation of complex geometric objects is highly dense point clouds, which is the native output of 3D scanners, for example. Splatting is a technique to approximately render a surface from point cloud primitives, where each discrete point is extended by a local surface kernel when rendered. Kernels overlapping the same pixel are averaged together in the frame buffer, so that the point cloud is rendered like a surface model. Care is taken in designing the kernel so that there are no holes in the rendered surface.

Our splatting method uses a simplified kernel that does not average overlapping samples, but simply writes a color value if the splat is determined to be visible for that subpixel. Instead of relying on an advanced filter kernel, our technique is similar to Riemann-integration, with a constant value per subpixel. For higher quality, more subpixels are used.

In some embodiments, adaptive tessellation and splatting are implemented. A tessellator tessellates the surface into mictrotriangles until each mictrotriangle is smaller than a given criterion. The microtriangles are then fed into a splatter unit that splats them into a frame buffer. The color and depth of a pixel or subpixel is updated if the centroid of a triangle or other micropolygon vertices when projected on screen fall within the pixel or sub-pixel. Thus, the centroid of the micropolygon must be computed. If the micropolygon centroid is inside the pixel, then the pixel's buffer needs to be updated with depth and color.

In order to tessellate the surface down to a size where the splatting, based on the micropolygon centroid is guaranteed to cover the entire surface, an edge length criterion is used. In one embodiment, if the edge length is less than three quarters of a pixel side length, then the centroid of a triangle covering the center of a pixel will fall within that same pixel. The centroid based splatting approach will thus cover the surface without any cracks as long as the surface does not in itself contain any cracks. It is the task of an adaptive tessellator unit to perform this type of tessellation.

Figure 2:
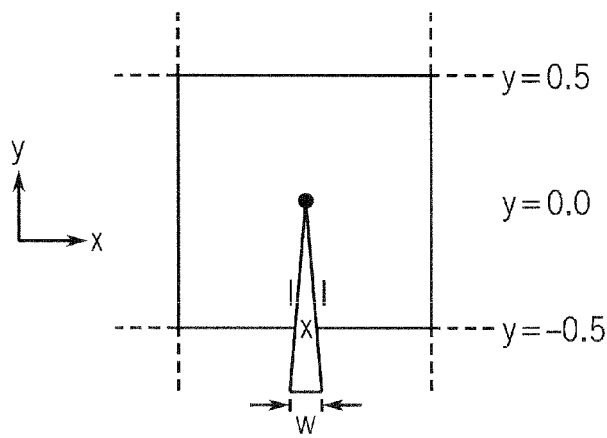
FIG. 2 is a depiction of a triangle with both a vertex and the centroid within the same pixel. The illustration shows the geometry configuration of a limit case, where both the centroid and a vertex are inside the pixel.

The three quarter pixel edge length is derived by appreciating that the longest edge length, that each triangle edge needs to be tessellated to, is obtained when one side, denoted w, of a triangle goes toward zero. As a consequence, the other two triangle edges have the same length l. In addition, the triangle should just barely overlap with the pixel's center. Referring to FIG. 2, the centroid in the y coordinate in this case is $(0+l+l)/3$. If this point is to be inside the pixel, then the following must hold: $(0+l+l)/3=\frac{1}{2}$, which means l must equal three quarters of the pixel side length. Hence, if the surface is adaptively tessellated so that each microtriangle edge is shorter than 0.75 pixels, then the centroid based splatting approach covers the surface without cracks.

Figure 6:
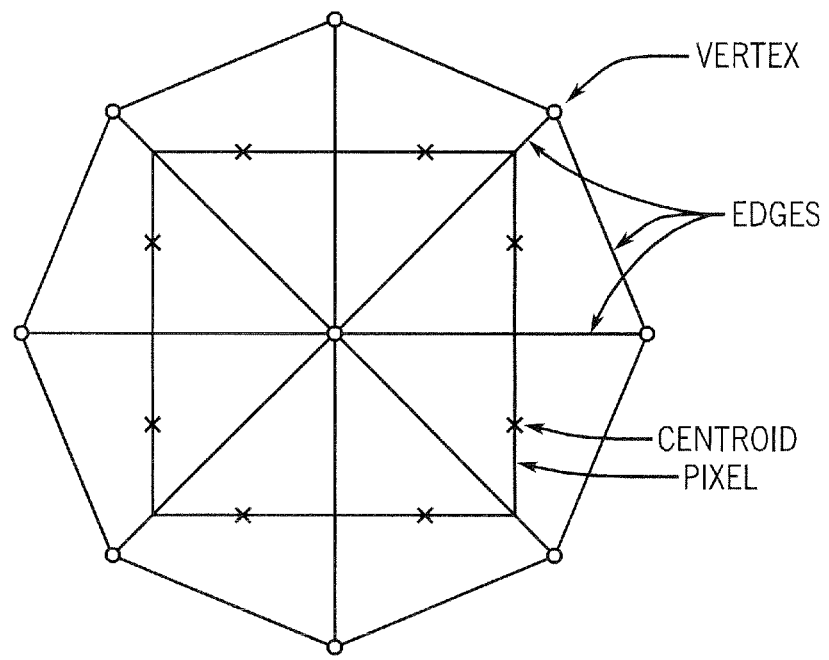
FIG. 6 is a depiction of a triangle fan with a shared vertex located in the pixel's center.

If the pixel is completely covered by a tessellated surface, the derivation can be relaxed in some embodiments. To derive the relaxed tessellation bounds, the example of a triangle fan with the shared vertex located in the pixel's center may be used. If the tessellated surface is watertight, at least one of the triangles must have its centroid within the pixel. Assume that an interior vertex of a tessellated surface is located at the center of the pixel. We search the maximum side length of a triangle, connected to this vertex, which has a centroid inside the pixel's area. The largest distance from this vertex to the centroid of any connected triangle is obtained if the two incident edges are as long as allowed by the length criterion. This length is denoted L. Assume that there are eight edges of length L connected to the center vertex, with one pointing down and with 45 degrees between each edge, as shown in FIG. 6. The Chebyshev distance from the pixel center to the centroid of each of the eight triangles is $L(1+1/\sqrt{2})/3$. If the Chebyshev distance is less than half of the pixel's side length, then the centroid is inside the pixel. Thus, the length criterion must be $L<3/(2+\sqrt{2})$ of a pixel's side length in order for the pixel to include a centroid. Perturbing any vertex from this formation lowers the minimum Chebyshev distance; the length criterion derived above is thus a maximum. We conjecture that it is a global maximum.

For polygons with more than three vertices, the maximum Chebyshev distance is obtained with a similar formation, but where each triangle is extended with the additional edges along the major axis of the center to the triangle centroid vector. For example, the maximum edge length is $L<2/(2+\sqrt{2})$ for quads, and $5/(8+2\sqrt{2})$ for pentagons.

With adaptive tessellation, the fulfillment of an edge length criterion can only be guaranteed if the parametric surface is continuous, so that when the parametric domain decreases, so does the projection of the surface part on the screen. Cases where this is not true may be identified during tessellation and handled by inserting additional splats through interpolation.

In some embodiments, rasterization may be avoided altogether, instead writing out the splats covering a single pixel. Hence, the triangle set-up becomes easier and the relatively expensive and inefficient rasterization of small triangles may be dispensed with entirely.

In some embodiments, surfaces that cannot fulfill an edge length criterion are rasterized instead of being splatted. Full triangle set-up, required for rasterization, is performed only for the surfaces that are rasterized.

Figure 1:
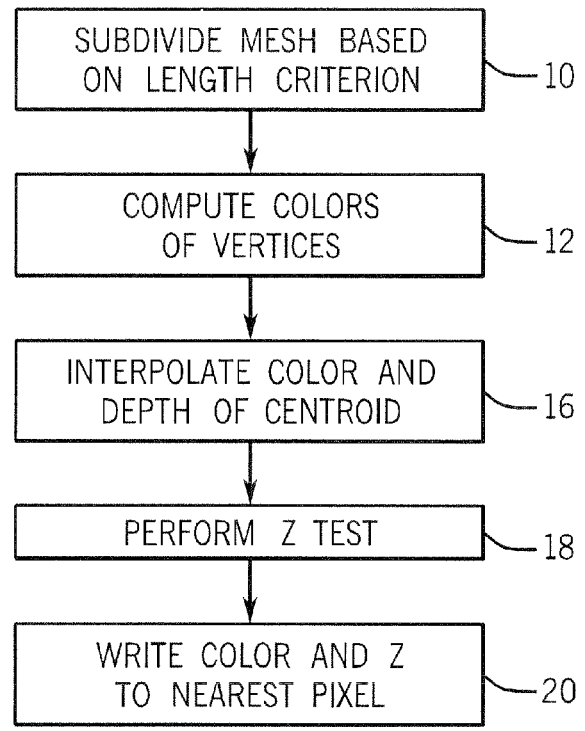
FIG. 1 is a flow chart for one embodiment of the present invention.

Thus, referring to FIG. 1, the first step of the sequence, indicated at block 10, is to recursively subdivide the mesh until the three projected, displaced edge lengths of a microtriangle are all less than 0.75 pixels in length. This length threshold may also be $3/(2+\sqrt{2})$ of a pixel's side length, or some other conservatively derived length. Then, as indicated in block 12, the colors of the vertices may be computed. Next, referring to block 16, the color and depth at the centroid of the triangle is interpolated from the color at the triangle's three vertex colors.

Then z test may be performed of the pixel splat, as indicated in block 18. In some embodiments, the color and the depth may be written to the pixel nearest the centroid, as indicated in block 20.

In some embodiments, the sequence described above may be implemented in software, hardware, or firmware, such as a graphics driver. In software embodiments, it may be implemented by a sequence of instructions stored on a non-transitory computer readable medium, such as a magnetic, optical, or semiconductor storage device. The sequence of instructions may be implemented by any processor based device.

For ease of explanation, we denote the pixel's view frustum as a pixel well. The problem at hand is to determine which of the micropolygon's splats inside the pixel well contribute to the pixel color. For each micropolygon, after the model view projection transform, a close to uniform distribution of point samples is generated in screen space by, for example, using a lookup table of sample positions, so that there is at least one splat per pixel. For anti-aliasing, the pixel wells are simply subdivided into sub-pixels. One sample affects only one (sub-)pixel and given that the sample is defined as closest, it fills the entire (sub-)pixel. In what we denote constant splatting, the sample with the smallest z coordinate is picked, regardless of its x,y position within the pixel well. Other approaches include planar approximation, and local curvature approximation.

This can be done at the pixel granularity or at sub-pixel levels, but for clarity, the one sample per pixel case is discussed in the following.

Figure 3:
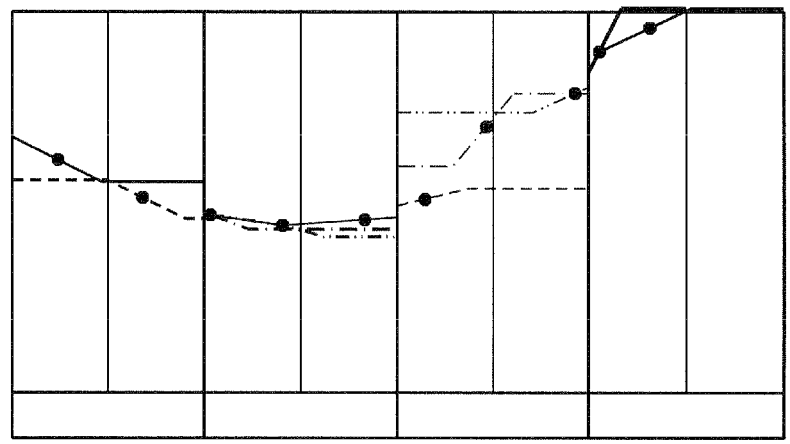
FIG. 3 is a depiction of locally planar surface approximation, used in the termination of a closest splat for a given pixel, according to one embodiment.

In the planar approximation, a disk is attached around each splat with limited extent, defined by the sample point and its derivatives, as shown in FIG. 3. This figure shows a 2D cross section for one row of pixel wells, so the disks are drawn as lines extruded from the splat positions. The depth value at the center of the pixel is computed as the intersection of the disk and a ray through the center of the pixel. If the distance to the pixel center, measured in the coordinate system of the disk, is larger than a given threshold, the depth value is approximated as a clamped value at the edge of the disk. This clamping is illustrated in FIG. 3.

To estimate a threshold for the extent of the disk, a local second order derivative may be used. For areas with high curvature, the local planar approximation is a coarse representation, and the radius, which is the representation of the disk, can be shortened. For example, care must be taken with a small sphere just behind a planar surface. If not adapting the extent of the disk to the curvature, samples from the sphere's silhouette may erroneously be visible through the planar surface. The tessellator may already take surface curvature into account to provide evenly sized triangles, and if available, local curvature can be used to estimate better thresholds for the disk radii.

Figure 4:
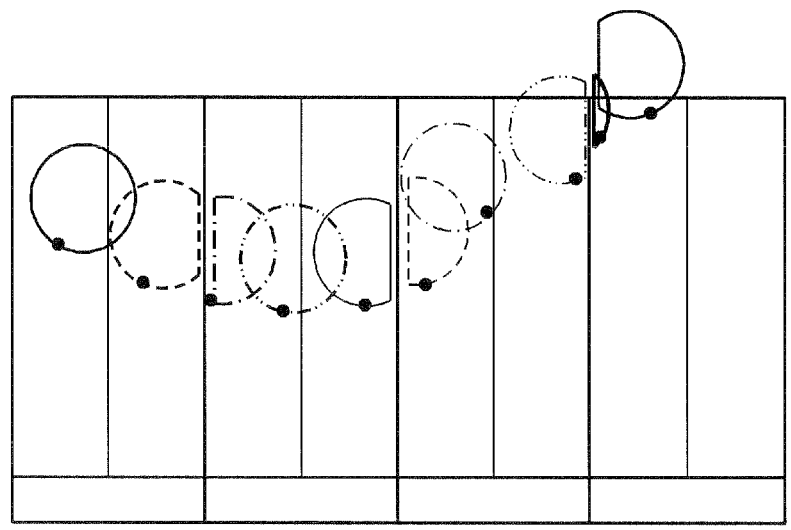
FIG. 4 is a depiction of local curvature surface approximation, used in the termination of a closest splat for a given pixel, according to one embodiment.

In the local curvature surface approximation, local spherical surface approximations may be used where algebraic spheres are fit to the centroids of the micropolygons, as shown in FIG. 4. Given a sphere tangent to each sample point, the local surface behavior can be approximated. Conceptually, a sphere is attached behind each splat and the sphere's normal is aligned with the surface normal of the sample point. Now, form a ray in the view direction, passing through the pixel center. The intersection depth of the ray and the sphere may be taken as the depth value for that sample. If there is no such intersection, the maximum depth of the sphere may be used instead.

Multi-sampling may be achieved by tessellating and evaluating the surface displacement shader down to pixel sized primitives. Once that threshold is reached, some embodiments may the then simply perform uniform, flat tessellation of the triangle with interpolation of colors and vertex positions in screen space (x,y) until these edge lengths are shorter than 0.75 sub-pixels, or some other conservative edge length criterion. Hence, we can use a split-and-dice tessellation approach until the microtriangles are relatively small, and then perform tessellation with interpolation inside the triangles.

In embodiments skipping rasterization and replacing rasterization with single pixel splatting, the majority of the triangle set up and all the actual rasterization process may be avoided. Moreover, pixel shading and vertex shading may be merged into a single shader, which simplifies programming in some embodiments.

In parallel rasterizers, pixel write conflicts may arise because multiple micropolygons end up on the same pixel. Collisions can occur in silhouette edges or when two patches that overlap in screen space are visibility tested in the same batch. It is important to minimize writes to the same sub-pixel location for competing micropolygons in flight in some embodiments. With splatting, the chance of multiple samples wanting to update the same sub-sample is higher and harder to avoid, since multiple splats from a single micropolygon can affect the same subpixel. This effect may be reduced by adapting the number of splats according to the micropolygon area. Alternatively, write conflicts may be reduced by parallelizing over micropolygons instead of splats within a micropolygon, or even over different higher order primitives. However, already today, there is hardware support in graphics cards for handling similar write conflicts, so we expect this to be simple to handle.

In general, it is desirable to take more visibility samples than shading samples so the shader may be evaluated once per micropolygon or micropolygon vertex. Splats may then be generated, distributed over the micropolygon, that all share the same shading value, or an interpolated shading value from the vertices. Approximating shading results through interpolation is less expensive than performing full shading. Thus, the shading rate may be lowered while computing visibility at a higher rate.

Figure 5:
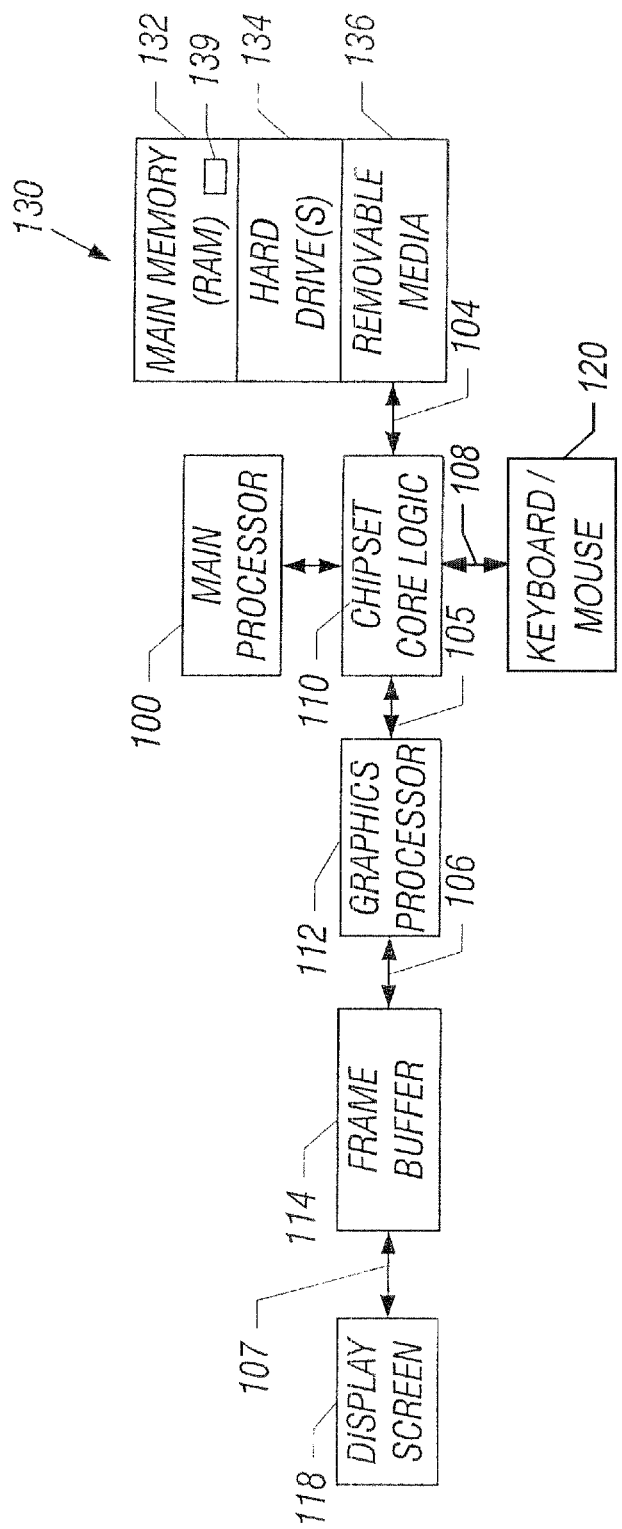
FIG. 5 is a schematic depiction for one embodiment of the present invention.

The computer system 130, shown in FIG. 5, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 or any available memory within the graphics processor. Thus, in one embodiment, the code to perform the sequences of FIG. 1 may be stored in a machine or computer readable medium, such as the memory 132 or the graphics processor 112, and may be executed by the processor 100 or the graphics processor 112 in one embodiment.

FIG. 1 is a flow chart. In some embodiments, the sequences depicted in this flow chart may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 1. In one embodiment, a program 139 may be stored in main memory 132.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
adaptively tessellating by subdividing a mesh until polygon edges are shorter than a predetermined length, thereby generating micropolygons;
computing the centroid of one of the micropolygons;
determining if the centroid is inside a pixel, and if so, updating a pixel buffer; and
avoiding rasterization by writing out splats covering the pixel.

2. The method of claim 1 including tessellating triangles until the edges are shorter than 3/(2+sqrt(2)) pixels in length.

3. The method of claim 1 including tessellating triangles until the edges are shorter than 0.75 pixels in length.

4. The method of claim 1 including tessellating quadrilaterals until the edges are shorter than 2/(2+sqrt(2)) pixels in length.

5. The method of claim 1 including rasterizing instead of splatting primitives when the underlying surface region is not continuous.

6. The method of claim 1 including using interpolation to further tessellate a micropolygon.

7. The method of claim 6 including using a lookup table of sample positions and providing at least one splat per pixel.

8. The method of claim 1 including determining visibility using planar surface approximation.

9. The method of claim 1 including determining visibility using local curvature surface approximation.

10. A non-transitory computer readable medium storing instructions to enable a computer to:
adaptively tessellating by subdividing a mesh until polygon edges are shorter than a predetermined length, thereby generating micropolygons;
computing the centroid of one of the micropolygons;
determining if the centroid is inside a pixel, and if so, updating a pixel buffer; and
avoiding rasterization by writing out splats covering the pixel.

11. The medium of claim 10 further storing instructions to tessellate triangles until the edges are shorter than 3/(2+sqrt(2)) pixels in length.

12. The medium of claim 10 further storing instructions to tessellate triangles until the edges are shorter than 0.75 pixels in length.

13. The medium of claim 10 further storing instructions to tessellate quadrilaterals until the edges are shorter than 2/(2+sqrt(2)) pixels in length.

14. The medium of claim 10 further storing instructions to rasterize instead of splatting primitives when the underlying surface region is not continuous.

15. The medium of claim 10 further storing instructions to use interpolation to further tessellate a micropolygon.

16. The medium of claim 15 further storing instructions to use a lookup table of sample positions and provide at least one splat per pixel.

17. The medium of claim 10 further storing instructions to determine visibility using planar surface approximation.

18. The medium of claim 10 further storing instructions to determine visibility using local curvature surface approximation.

19. An apparatus comprising:
a processor to generate micropolygons by adaptively tessellating by subdividing a mesh until polygon edges are shorter than a predetermined length and avoid rasterization by writing out splats covering the pixel, computing the centroid of one of the micropolygons, determining if the centroid is inside a pixel, and if so, updating a pixel buffer; and
a storage coupled to said processor.

20. The apparatus of claim 19, said processor to tessellate triangles until the edges are shorter than 3/(2+sqrt(2)) pixels in length.

21. The apparatus of claim 20, said processor to tessellate triangles until the edges are shorter than 0.75 pixels in length.

22. The apparatus of claim 20, said processor to tessellate quadrilaterals until the edges are shorter than 2/(2+sqrt(2)) pixels in length.

23. The apparatus of claim 19, said processor to use interpolation to further tessellate a micropolygon.

24. The apparatus of claim 23, said processor to use a lookup table of sample positions and to provide at least one splat per pixel.

* * * * *